US008682722B1

(12) United States Patent
Des Jardins et al.

(10) Patent No.: US 8,682,722 B1
(45) Date of Patent: Mar. 25, 2014

(54) CONTROLLING USER EXPERIENCE

(75) Inventors: G. Thomas Des Jardins, Alexandria, VA (US); Bryan Slavin, Rockville, MD (US); Mark Westling, Chevy Chase, MD (US)

(73) Assignee: Advertising.com LLC, Dulles, VA (US)

( * ) Notice: Subject to any disclaimer, the term of this patent is extended or adjusted under 35 U.S.C. 154(b) by 1478 days.

(21) Appl. No.: 11/341,873

(22) Filed: Jan. 30, 2006

Related U.S. Application Data

(60) Provisional application No. 60/709,450, filed on Aug. 19, 2005, provisional application No. 60/647,456, filed on Jan. 28, 2005.

(51) Int. Cl.
*G10H 1/26* (2006.01)
*H04N 7/10* (2006.01)
*G11C 7/00* (2006.01)

(52) U.S. Cl.
USPC ......... 705/14.49; 705/7.11; 455/3.01; 84/609

(58) Field of Classification Search
USPC .................. 707/101, 104.1; 725/34, 87, 146; 455/3.01; 365/200; 84/609; 705/14.49, 705/7.11
See application file for complete search history.

(56) References Cited

U.S. PATENT DOCUMENTS

| 6,029,045 | A  | * | 2/2000 | Picco et al. ..................... 725/34 |
| 6,198,906 | B1 | * | 3/2001 | Boetje et al. ................. 455/3.01 |
| 6,248,946 | B1 | * | 6/2001 | Dwek .............................. 84/609 |
| 6,552,254 | B2 | * | 4/2003 | Hasegawa et al. .............. 84/609 |
| 7,401,097 | B1 | * | 7/2008 | Baer et al. .............................. 1/1 |
| 2002/0023274 | A1 | * | 2/2002 | Giacalone, Jr. ............... 725/146 |
| 2003/0056222 | A1 | * | 3/2003 | Iwata et al. ..................... 725/87 |
| 2003/0058707 | A1 | * | 3/2003 | Dilger et al. .................. 365/200 |
| 2005/0154746 | A1 | * | 7/2005 | Liu et al. ....................... 707/101 |

* cited by examiner

*Primary Examiner* — John G Weiss
*Assistant Examiner* — Marilyn G Macasiano
(74) *Attorney, Agent, or Firm* — Finnegan, Henderson, Farabow, Garrett & Dunner, LLP

(57) ABSTRACT

A client-side advertising application may work with an advertising back-end and a content downloading system to perform one or more of the following functions: download advertising content, manage the downloaded advertising content, define the user experience, facilitate the dynamic insertion of the downloaded advertising content into or around downloaded programming content, and ensure auditing messages are sent to an auditing server.

31 Claims, 11 Drawing Sheets

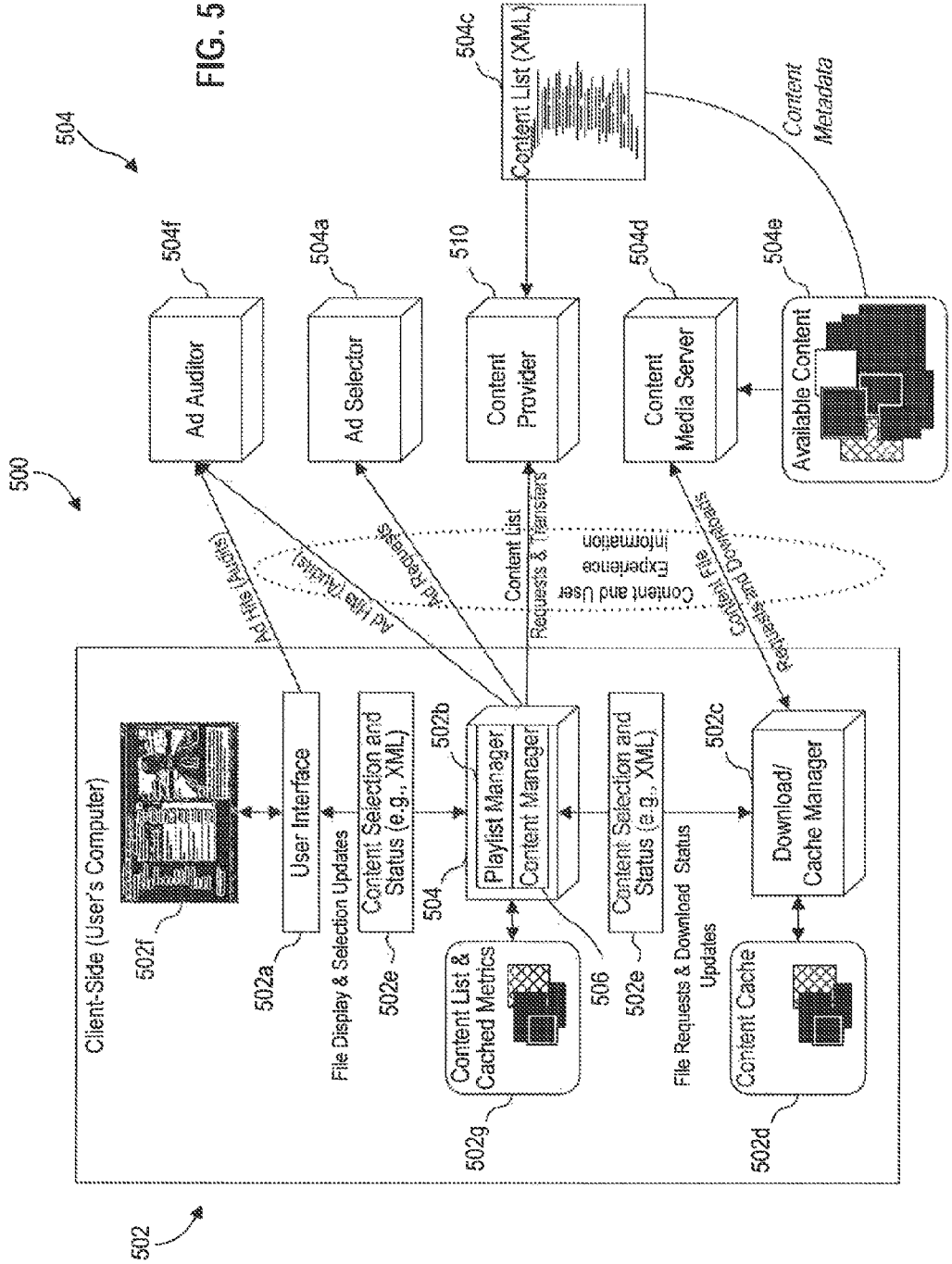

CONTROLLING USER EXPERIENCE

CLAIM OF PRIORITY

This application claims priority under 35 USC §119(e) to U.S. patent application Ser. No. 60/647,456, filed on Jan. 28, 2005 and to U.S. Patent Application Ser. No. 60/709,450, filed on Aug. 19, 2005, both of which are hereby incorporated by reference.

TECHNICAL FIELD

This disclosure relates generally to the delivery of content to end users.

BACKGROUND

Dynamic content may be delivered across packet-based networks, such as the Internet, and presented to users by a media player. Dynamic content generally refers to content that continuously or nearly continuously changes over time (that is, content with a temporal dimension), such as audio and/or visual content.

A media player may operate to present such content in at least two general ways. First, the media player can begin playing the content while the content is sent over the network. This is generally referred to as streaming, and the associated content may generally be referred to as streaming content. Streaming content may present certain advantages to the end-users, such as reducing the time between the content's selection and display and removing the need for client-side storage of media files.

Streaming content typically falls into two general categories: broadcast and on-demand. To a streaming server, a broadcast source is usually any external video or audio feed, such as a television or radio station, whereas an on-demand source is usually a multimedia file chosen by the user.

Broadcast streams are generally entered "in progress" by users. Each client connects to a single "pushed" stream so all clients experience the same portion of the media at the same time. Advertising and other marketing messages may be inserted into or around the content at spot breaks (also termed spot sets or pods).

On-demand streams are generally discrete "pulled" multi-media segments, such as individual songs or video clips that are delivered to each client upon request. Each client starts at the beginning of the clip. Unlike broadcast streams, in on-demand streams, advertising and marketing messages are usually put before and after the content (however, advertising and other marketing messages can be placed in-between two on-demand streams to achieve a similar effect as spot breaks in broadcast streams).

Second, as an alternative to streaming, the content may be completely downloaded in advance of play by the media player. The content associated with this method of operation may generally be referred to as downloaded content. The download approach may allow for delivery of higher-definition content than what the user's network connection might otherwise support when streaming, and may allow for offline viewing of content. Additionally, allowing the user to download high-definition content in advance of play may reduce the content publisher's reliance on more expensive streaming technologies.

Downloaded content may be handled through a download manager that resides on the user's PC or other media-playing platform. A download manager may let a user explicitly specify the content of interest, or it may pre-fetch content that it anticipates will be viewed at some point in the future.

SUMMARY

The techniques described below may be particularly advantageous in a downloaded content environment. Downloaded content may present difficulties in relation to the insertion of advertising content and/or marketing messages into or around editorial content. In a streaming environment, the media player is connected to the network; hence, the player (or supporting software working with the player) can contact an ad server in real-time to select appropriate advertising media files and stream those files as needed from remote servers. In a downloaded content environment, however, the network connection may not be present during playback. Additionally, for a consistent user experience, downloaded, high-definition content may need similar quality advertising content. The similar quality advertising content may preclude streaming because the network doesn't have the available bandwidth needed to stream the higher quality advertising content.

Also, in a downloaded content environment, because a network connection may not be present during playback, the user platform may not be able to send real-time auditing messages to an ad audit server indicating that a specific ad was presented to the user. However, it may be desirable to insure that auditing messages are sent to the ad audit server so that advertisers can be appropriately billed.

This document describes, among other things, implementations of a client-side advertising application. One implementation of the client-side advertising application works with an advertising back-end and a content downloading system to download advertising content, to manage the downloaded advertising content, to define the user experience, to facilitate the dynamic insertion of the downloaded advertising content into or around downloaded programming content, and to insure auditing messages are sent to an auditing server. Advertising content or media is generally any other content besides the editorial or programming content, and is typically content that promotes particular services or goods. Advertising content may be, for example, previews for programming content being offered in the future (referred to as "previews"), an indication of the source of programming content (referred to as "branding"), or promotions to buy or otherwise acquire specific products or services (referred to as "advertisements"). Specific examples of such content include channel ids, notification of upcoming programming in the playlist, and cross-promotions of similar editorial content. Furthermore, while this document describes inserting advertising content, the additional content inserted may more generally be any interstitial elements.

The client-side advertising system may integrate with a content delivery management system for operation in an on-line or off-line environment. In one implementation, when the client system is connected to a network, it contacts the back-end ad system for ad decisions that may be used in the future. It downloads advertising media files using the delivery management system so these files are available when a user plays downloaded editorial content. At the point when the user plays the editorial content, the client-side advertising system also communicates with the media player to specify which advertising media files to insert and in which order the files should be played, all without the need to communicate with the ad server. Finally, when a network connection is available, the client-side advertising system sends audit records of all ad plays to the backend ad system for billing and reporting purposes.

Generally, in one aspect, a client-side content presentation system includes an interface component and an experience manager. The interface component is configured to present an interface that allows a user to select a piece of editorial content for presentation. The experience manager is configured to obtain a set of rules and select at least one piece of additional content based on the rules when the user selects the piece of editorial content for presentation. In addition, the experience manager is configured to provide a playlist to the user interface component when the user selects the piece of editorial content for presentation. The playlist includes the piece of editorial content and the selected piece of additional content. The user interface component is configured to use the playlist to present the piece of editorial content and the selected piece of additional content.

Implementations of this aspect may include one or more of the following features. For example, the additional content may be advertising content and the rules may include business rules. The business rules may include campaign business rules and user experience business rules. The playlist manager may be configured to receive auditing messages from the interface component when a network connection to an ad auditor is unavailable and to send the stored auditing messages to the ad auditor when the network connection to the ad auditor is available.

Alternatively, or additionally, the interface may allow the user to select a piece of editorial content for download. The system may include a download manager configured to download the piece of editorial content when the user selects the piece of editorial content for download and to download a set of additional content. The experience manager may be configured to select at least one piece of additional content from the set of downloaded additional content based on the rules when the user selects the downloaded piece of editorial content for presentation. The playlist may be provided to the user interface component when the user selects the downloaded piece of editorial content for presentation and the playlist may include the downloaded piece of editorial content and the selected piece of additional content.

In another aspect, a system includes an interface component, a content manager, a download manager, and a playlist manager. The interface component is configured to present an interface that allows a user to select a piece of editorial content for download. The content manager is configured to select a piece of additional content and to associate the selected piece of additional content with the piece of editorial content. The download manager is configured to download the piece of editorial content when the user selects the piece of editorial content for download and to download the piece of additional content. The playlist manager is configured to provide a playlist to the user interface component when the user selects the downloaded piece of editorial content for presentation. The playlist includes the downloaded piece of editorial content and the downloaded piece of additional content. The user interface component is configured to use the playlist to present the downloaded piece of editorial content and the downloaded piece of additional content.

Implementations of this aspect may include one or more of the following features. For example, the piece of additional content may be advertising content. To select the piece of additional content, the content manager may be configured to obtain an indication of a set of additional content, the set of additional content including the piece of additional content; obtain campaign business rules for the set of additional content; obtain user experience business rules; and select the piece of additional content from the set of additional content based on the obtained campaign business rules and the obtained user experience business rules.

The content manager may be configured to select the piece of additional content when a network connection to an ad selector is unavailable. The content manager may be configured to communicate with an ad selector to receive the indication of a set of additional content, the campaign business rules, and the user experience business rules. To select the piece of additional content, the content manager may be configured to communicate with an ad selector to obtain an indication of the piece of additional content. To associate the piece of additional content with the piece of editorial content, the content manager may be configured to insert an identifier of the piece of additional content into a content list that includes an identifier for the piece of editorial content.

The campaign business rules indicate one or more of the following, including: one or more content categories of editorial content, timing of when the additional content should be presented, percentage of users to whom the additional content should be presented, frequency with which the additional content should be presented, number of times the additional content should be presented in a period of time, or geographic locations. The user experience business rules may indicate one or more of the following, including: one or more ratios of additional content presented to editorial content presented, one or more types of additional content that should be presented, and one or more orders in which additional content and editorial content should be presented.

The user interface component may be configured to send an auditing message to the playlist manager when the user interface component presents the piece of additional content while a network connection to an ad auditor is unavailable. The playlist manager may be configured to send the auditing message to the ad auditor when a network connection to the ad auditor is available.

In another aspect, a method includes presenting an interface that allows a user to select a piece of editorial content for download; selecting a piece of additional content; associating the selected piece of additional content with the piece of editorial content; and downloading the piece of editorial content when the user selects the piece of editorial content for download. The method also includes downloading the piece of additional content; providing a playlist to the user interface component when the user selects the downloaded piece of editorial content for presentation, the playlist including the downloaded piece of editorial content and the downloaded piece of additional content; and presenting the downloaded piece of editorial content and the downloaded piece of additional content using the playlist.

Implementations of this aspect may include one or more of the following features. For example, the piece of additional content may be a piece of advertising content. Selecting the piece of additional content may include obtaining an indication of a set of additional content, the set of additional content including the piece of additional content; obtaining campaign business rules for the set of additional content; obtaining user experience business rules; and selecting the piece of additional content from the set of additional content based on the obtained campaign business rules and the obtained user experience business rules.

Selecting the piece of additional content may include selecting the piece of additional content from the set of additional content when a network connection to an ad selector is unavailable. Obtaining the indication of a set of additional content, the campaign business rules, and the user experience business rules may include communicating with an ad selector to receive the indication of a set of additional content, the campaign business rules, and the user experience business rules. Selecting the piece of additional content may include communicating with an ad selector to obtain an indication of the piece of additional content. Associating the piece of additional content with the piece of editorial content may include inserting an identifier of the piece of additional content into a content list that includes an identifier for the piece of editorial content.

The method may include storing an auditing message when the piece of additional content is presented while a network connection to an ad auditor is unavailable. The method also may include sending the auditing message to the ad auditor when a network connection to the ad auditor is available.

Implementations of the described techniques may include hardware, a method or process, and computer software on a computer-accessible medium.

The details of one or more implementations are set forth in the accompanying drawings and the description below. Other features will be apparent from the description and drawings, and from the claims.

DESCRIPTION OF DRAWINGS

FIG. 5 illustrates another implementation of a system for associating and coordinating the playback of advertising content with downloaded editorial content.

DETAILED DESCRIPTION

Various implementations of a advertising application are described. Implementations may perform various functions, such as, for example, defining the user experience and facilitating the dynamic insertion of downloaded advertising content into or around downloaded editorial content, whether a network connection is available or not. Implementations of the advertising application may reside on the user's client system and communicate with an ad server when a network connection is available, download advertising media files to the user's client system, insert advertising content into or around editorial content when the editorial content is played by the user, and record auditing messages for communication back to the ad server when a network connection is available.

Figure 1:
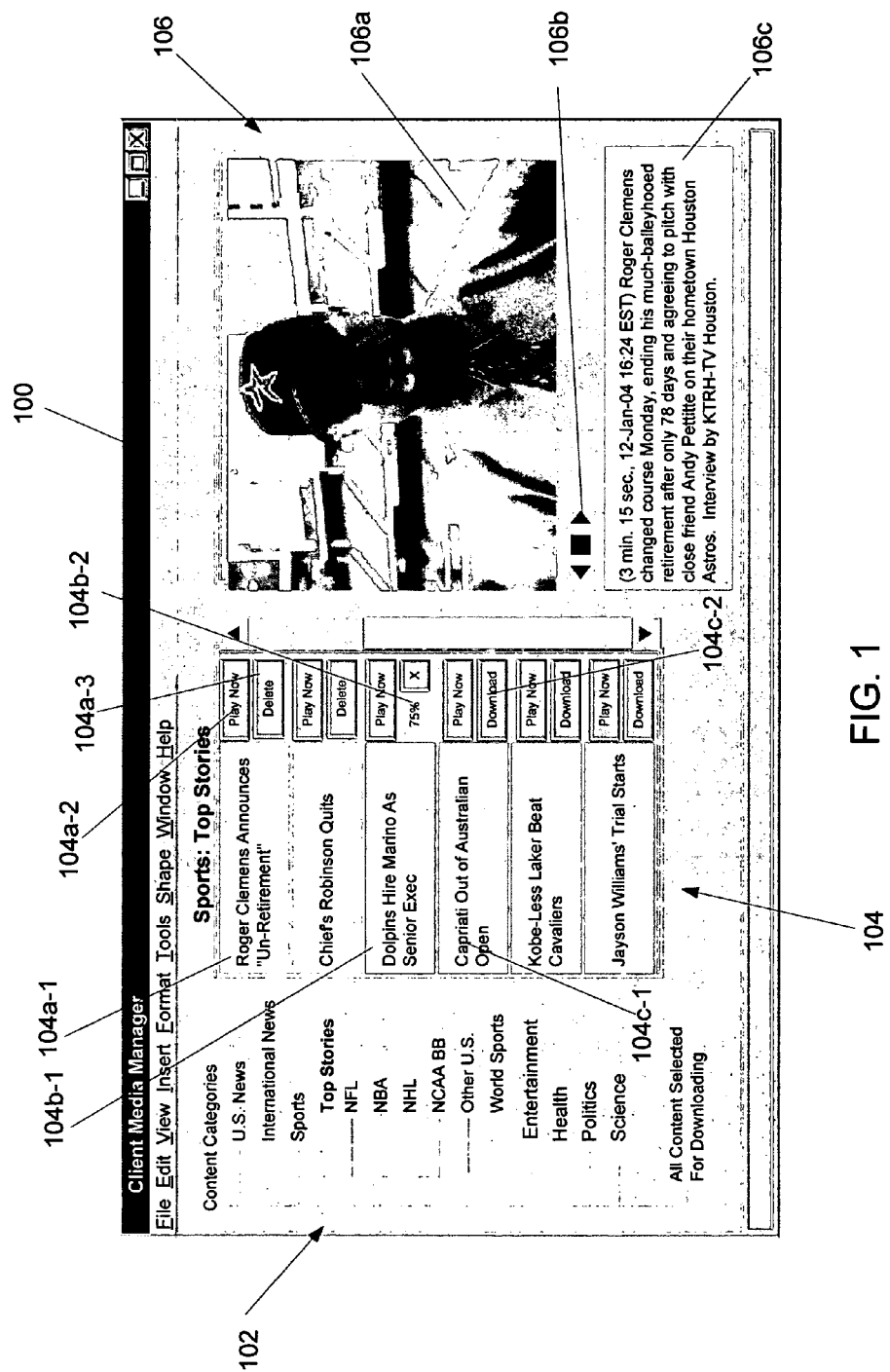
FIG. 1 illustrates an example of a user interface that may be provided on a user's client system.

FIG. 1 illustrates an example of a user interface 100 that may be provided on a user's client system to allow the user to select editorial content, such as video and/or audio files, to be downloaded prior to playback of the video and/or audio files. In general, the user interface 100 is an application interface or a web page that displays dynamic content that is available for downloading, the status of that content (e.g., downloaded and available for presentation, in the process of downloading, or available for downloading), and allows the user to select content for downloading.

User interface 100 includes a content category section 102, a content selection section 104, and a content presentation section 106. The content category section 102 displays a hierarchy of content categories from which the user can select. In the example shown, top-level categories include U.S. News, International News, Sports, Entertainment, Health, Politics, and Science. Also, in the example shown, there are sub-categories underneath the top-level category of Sports. The sub-categories shown are Top Stories, NFL, NBA, NHL, NCAA BB, Other U.S., and World Sports.

When a user selects a top-level category or a sub-category, the editorial content available in the selected category is displayed in the content selection section 104. The content selection section 104 indicates the status of editorial content in the selected category, and allows the user to select editorial content for downloading. For example, a button associated with each piece of content may switch states depending on the status of the associated content. As shown in the example of FIG. 1, the content described by label 104a-1 is indicated as downloaded and available for presentation because button 104a-3 is labeled "Delete," while the content described by label 104b-1 is indicated as downloading because the section 104b-2 indicates the content described by label 104b-1 is 75% downloaded. The content described by label 104c-1 is indicated as available for downloading because the button 104c-2 is labeled as "Download."

By selecting button 104a-3, the user can delete the downloaded editorial content described by label 104a-1. By selecting button 104c-2, the user can initiate a download of the editorial content described by the label 104c-1. Also, play buttons associated with each piece of content allow the user to initiate a presentation of the associated content. For instance, by selecting play button 104a-2, the user can initiate a presentation of the editorial content described by label 104a-1.

When a user selects editorial content for presentation, the editorial content itself, and/or information associated with the content is presented by content presentation section 106. For example, when the content is video, the video may be presented in a video playback section 106a. If the content is audio, for instance, the audio may be played on speakers connected to the users client system, and video content associated with the audio (e.g., a visualization) may be presented in video section 106a. Content presentation section 106 also may have controls 106b that allow the user to control the presentation of the content, and may include a section 106c that provides additional information about the content, such as a summary or description of the content.

In addition to presenting the editorial content, user interface 100 presents advertising content associated with the downloaded content. For example, if the editorial content is video content (with or without accompanying sound) that is presented in section 106a, video advertising content (with or without accompanying sound) may be presented in video section 106a before, after, or during the presentation of the editorial content in video section 106a. Alternatively, or additionally, logos, brand names, or other advertising material may be presented in the areas surrounding video section 106a while the editorial content is being presented in video section 106a. If the editorial content is audio only (e.g., music), then video advertising content (with or without accompanying sound) may be presented in video section 106a before, during, or after the audio only content is presented. Alternatively, or additionally, audio only advertising content may be presented before, during, or after the audio only editorial content, and/or logos, brand names, or other advertising material may be displayed in the areas surrounding the video section 106a during presentation of the audio only editorial content.

The presentation of content may, at least in part, be implemented by a separate media player application accessed through a set of Application Programming Interfaces (APIs). For example, Windows Media Player® may be embedded as part of a web page, or used by a stand-alone application, through an ActiveX control. On the other hand, the media player may be integral to the application providing the user interface 100, that is, the media presentation functions may be coded into the application.

Figure 2:
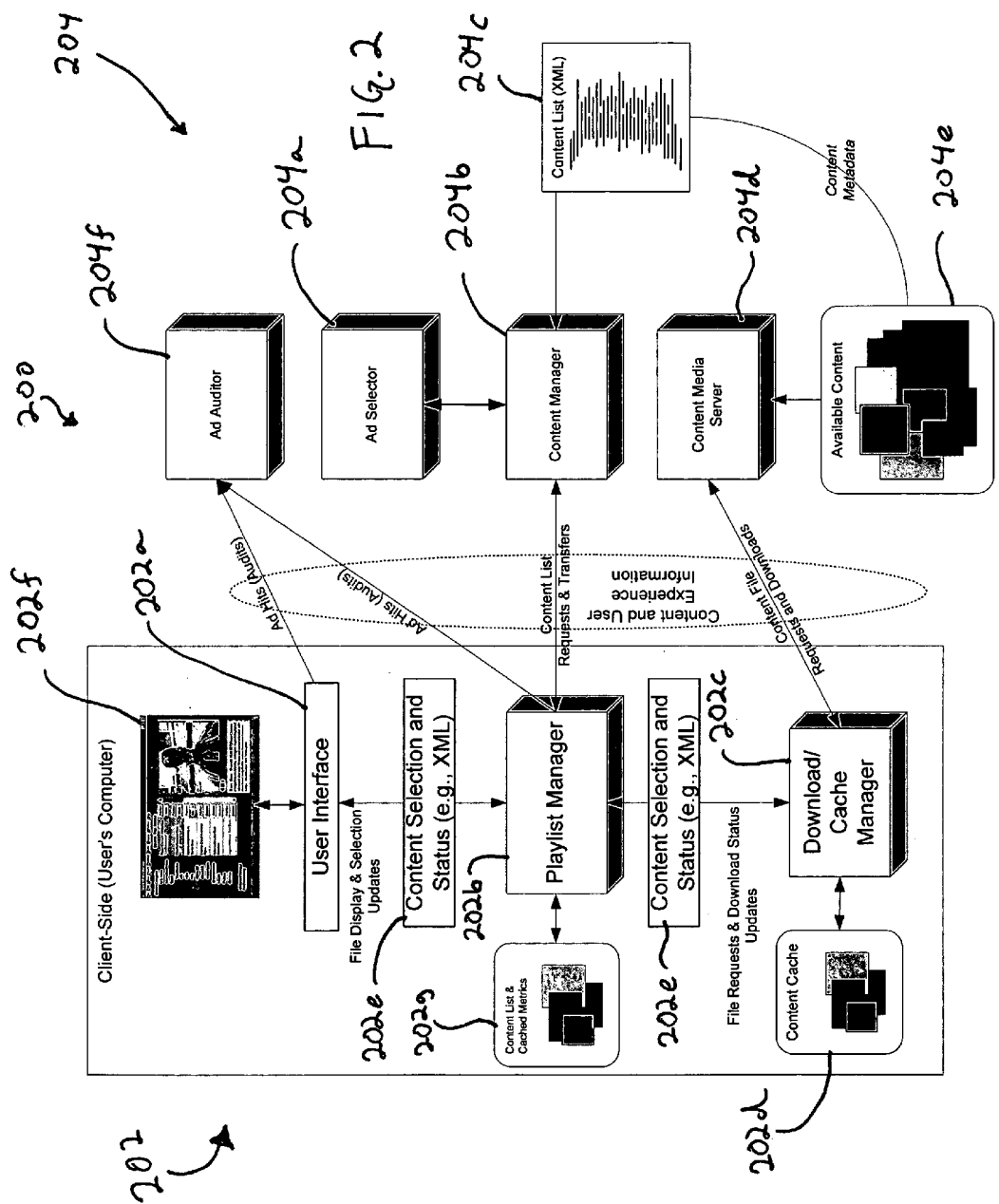
FIG. 2 illustrates one implementation of a system for associating and coordinating the playback of advertising content with downloaded editorial content.

Referring to FIG. 2, in one implementation, a system 200 for associating and coordinating the playback of advertising content with downloaded editorial content includes client-side components 202 and server-side components 204. The client-side components include a user interface component 202a that produces an interface 202f, such as interface 100, a playlist manager 202b, a cache manager 202c, a content cache 202d, a content list and metrics cache 202g, and a content selection and status list 202e. The server-side components 204 include an ad selector 204a, a content manager 204b, a content list 204c, a content media server 204d, available content 204e, and an ad auditor 204f.

With respect to the client-side components 202, the content selection and status list 202e generally contains a list of the available content categories, the content available in each of the categories, and indicates the current status of the available content (e.g., downloaded, available for download, or in the process of downloading). The content selection and status list 202e is used by the playlist manager 202b to coordinate the cache manager 202c and the user interface component 202a.

The user interface component 202a generates an interface 202f that displays the available content categories, the available content associated with those categories, and the status of the available content (e.g., in the local cache, downloading, etc.). The user interface component 202a also allows the user to select content for downloading, and allows the user to select content for presentation. The user interface component 202a builds the interface 202f based on the information in the content selection and status list 202e provided by the playlist manager 202b. The user interface component 202a also sends updates to the playlist manager 202b based on user actions, such as selecting content for download or deletion.

In addition, when the advertising content is presented, the user interface component 202a generates auditing messages and then sends those auditing messages to the ad auditor 204f. In general, as described further below, the auditing messages indicate that a particular piece of advertising content was presented to the user, and may indicate the user's behavior while the advertising content was being presented. In some implementations, the user interface component 202a may generate and send the auditing messages to the ad auditor 204f if a network connection to the ad auditor 204f is available when the auditing message is generated, and may send the auditing messages to the playlist manager 202b if a network connection to the ad auditor 504f is not available. The playlist manager may store the auditing messages in the content list and metrics cache 202f and then send the stored auditing messages to the ad auditor 204f when a network connection to the ad auditor 204f becomes available.

The cache manager 202c controls the downloading of selected editorial content and associated advertising content, which is then stored in the content cache 202d. The cache manager 202c uses the content selection and status list 202e to select and download the media files for the selected editorial content and associated advertising content. The cache manager 202c controls the downloads based on user preferences such as network or processor idle time, and bandwidth limits. Also, based on the content selection and status list 202e, the cache manager 202c deletes files based on content expiry times specified in the content selection and status list 202e or indications in the content selection and status list 202e that the user has selected the content for deletion. The cache manager 202c also may delete content based on user preferences such as maximum length of time content should be retained.

In general, the playlist manager 202b coordinates the user interface component 202a and the cache manager 202c through the content selection and status list 202e. The playlist manager initially generates the content selection and status list 202e based on the content list 204c obtained from the content manager 204b. For example, if the content selection and status list 202e and the content list 204c use the same data structure, the content list 204c may simply be used as the content selection and status list 202e. Alternatively, the information contained in the content list 204c may be extracted and used to create a new list for the content selection and status list 202e.

The playlist manager 202b provides the content selection and status list 202e to the user interface component 202a, which uses the content selection and status list 202e to generate the interface 202f that displays the content categories and available content, along with the current status of the available content (e.g., downloaded, available for download, or in the process of downloading). When the user uses the interface 202f to select a piece of content for download, or to delete a piece of downloaded content, the user interface component 202a communicates this to the playlist manager 202e. The playlist manager 202b updates the content selection and status list 204e to reflect the user selections or deletions, and sends the updated content selection and status list 202e to the cache manager 202c. Based on the content selection and status list 202e, the cache manager 202c downloads the media files for the selected editorial content and associated advertising content, and deletes the media files for the deleted editorial content and associated advertising content.

In addition, when the cache manager 202c completes the download of selected editorial content and associated advertising content, the cache manager 202c communicates this information to the playlist manager 202b. The playlist manager 202b updates the content selection and status list 202e with this information, and sends the updated content selection and status list 202e to the user interface component 202a. The user interface component 202a updates the interface 202f to reflect the updated information in the content selection and status list 202e.

With respect to the server-side components, the ad selector 204a and ad auditor 204f may be part of an advertising back-end system. The back-end advertising system may be a hosted platform for selecting, inserting and managing advertising and marketing messages into or around editorial content, both streaming and downloaded. The backend system may support a variety of delivery mechanisms, including broadband, video-on-demand (VOD), interne protocol television (IPTV), media center PCs, mobile streaming media, and downloaded video content.

In general, the backend system may perform five primary functions, as well as various other functions: (1) Planning, creation, and management of targeted campaigns (campaign management); (2) Managing the subscriber experience: the type and sequence of message delivery (experience management); (3) Business intelligence: campaign performance analysis and audience analytics; (4) Selecting advertising content for insertion within and around content; and (5) Confirming and counting ad deliveries (auditing).

The first function, campaign management, lets advertising operations managers specify, for example, business rules associated with an advertising campaign. The business rules regarding an advertising campaign generally define the parameters under which the associated advertising content should be presented, such as one or more content categories of the editorial content, the timing that the advertising content should be presented (for example, at night or mid-afternoon), the percentage of the population to whom the advertising media should be presented, the frequency with which the advertising media should be presented, the number of times the associated advertising content should be presented in a period of time, and/or the geographic location(s) of the users to whom the advertising media should be presented. The campaign management function also may include advertising inventory forecasting and reservation. Techniques and a system for defining campaign business rules, as well as performing advertising forecasting, is described in U.S. application Ser. No. 11/088,262, titled "Managing Advertising Inventory," filed on Mar. 24, 2005, and incorporated herein by reference.

The second function, experience management, lets advertising operations managers specify, for example, business rules associated with the overall user experience, such as the ratio of advertising content presented to editorial content presented, what type of advertising content is presented (e.g., branding, advertisements, preview), and the order that advertising content and editorial content is presented. These various user experience rules may be applied, for example, on a per editorial content basis, a per content category basis, or may be applied for the overall set of editorial content (or some other logical grouping of editorial content). For example, advertising operations managers may set a ratio of advertising content to editorial content for a specific category or type of editorial content, such as sports related content or popular content. As another example, advertising operations managers may also designate that, for a particular category of content, a preview is presented first, then an advertisement, and then the editorial content is presented. Techniques and a system for defining user experience business rules is described in U.S. application Ser. No. 11/023,638, titled "Advertising Content Delivery," filed on Dec. 29, 2004, and incorporated herein by reference.

The third function, business intelligence, gives advertising operations managers insight into, for example, the campaign performance, audience metrics, and audience behavior. The fourth function, selecting advertising content, is generally performed based on the business rules (both campaign rules and user experience rules) and information obtained in requests to the advertising back-end for the selection of advertising content to be presented with the editorial content.

The auditing function may provide advertisers with information about which ads were actually delivered to users, along with information about the user's actions while the advertising content was presented. To enable the auditing function, the client systems may send auditing messages to the back-end advertising system. The auditing messages indicate which advertising content was presented to the user, and may additionally include information about the user's behavior during the presentation of the advertising content, along with other information. Auditing messages and techniques related to auditing messages is described in U.S. application Ser. No. 11/023,631, titled "Auditing of Content Related Events," filed on Dec. 29, 2004, and incorporated herein by reference.

In general, based on the campaign business rules and the user experience business rules, the ad selector 204a selects one or more appropriate pieces of advertising content to be associated with a particular piece of editorial content. At times, depending on the business rules, the ad selector 204a may actually select zero pieces of advertising content.

The ad auditor 204f receives auditing messages from the client system. The auditing messages generally may help in appropriately billing advertisers for the advertising content that is presented. In general, the auditing messages indicate that a particular piece of advertising content was presented to the user, and may indicate the user's behavior while the advertising content was being presented (e.g., whether the user minimized the interface 202f, whether the user paused the media player, or whether the media player was in full screen mode). The auditing messages also may contain other information, such as the category of editorial content associated with the advertising content present, an identifier of the editorial content, and the time that the editorial content is being presented. The auditing message may contain a unique identifier for the user, such as a globally unique identifier (GUID).

The content manager 204b serves available content lists 204c to the client systems. The content lists 204c include metadata describing the content categories and the available editorial content. The content lists 204c generally may be managed and made available by a content provider (not shown). For example, a content provider may make the content lists available as a web service, with the content manager 204b accessing the web service to obtain a copy of the content list 204c.

When the playlist manager 202b requests the content list 204c, the playlist manager 202b may pass an identifier (e.g., GUID) of the user to the content manager 204b, which passes the identifier along with other information, such as the content categories included in the content list 204c or identifiers of the editorial content included in the content list 204c, to the ad selector 204a. Based on the this information and the business rules, the ad selector 204a selects particular advertising content, and returns identifiers of the advertising content along with indications of which editorial content each piece of advertising content should be associated with. The content manager then updates the content list 204c to include the indicators of the advertising content, and then sends the updated content list 204c to the playlist manager 202b. As described above, depending on the business rules, the ad selector 204a may, at times, actually select zero pieces of advertising content to be associated with a piece of editorial content. In this case, the ad selector 204a indicates that no advertising content should be associated with the editorial content and the content list 204c is updated or not as appropriate.

When a user uses the interface 202f to select a piece of editorial content to be presented, the user interface component 202a sends a request to the playlist manager 202b for the playlist associated with the selected editorial content. The playlist manager 202b uses the content list to develop a playlist that contains the media files for the editorial content and the associated advertising content and sends the playlist to the user interface component 202a. The user interface component 202a then presents the editorial and advertising content according to the playlist.

The content media server 204d is a file server that sends media files to client machines at a time and bandwidth dictated by the client's cache manager 202c. Transmission can be interrupted and restarted if, for example, the cache manager 202c determines that the computer is being actively used or that extra bandwidth is required for other user operations.

Figure 3:
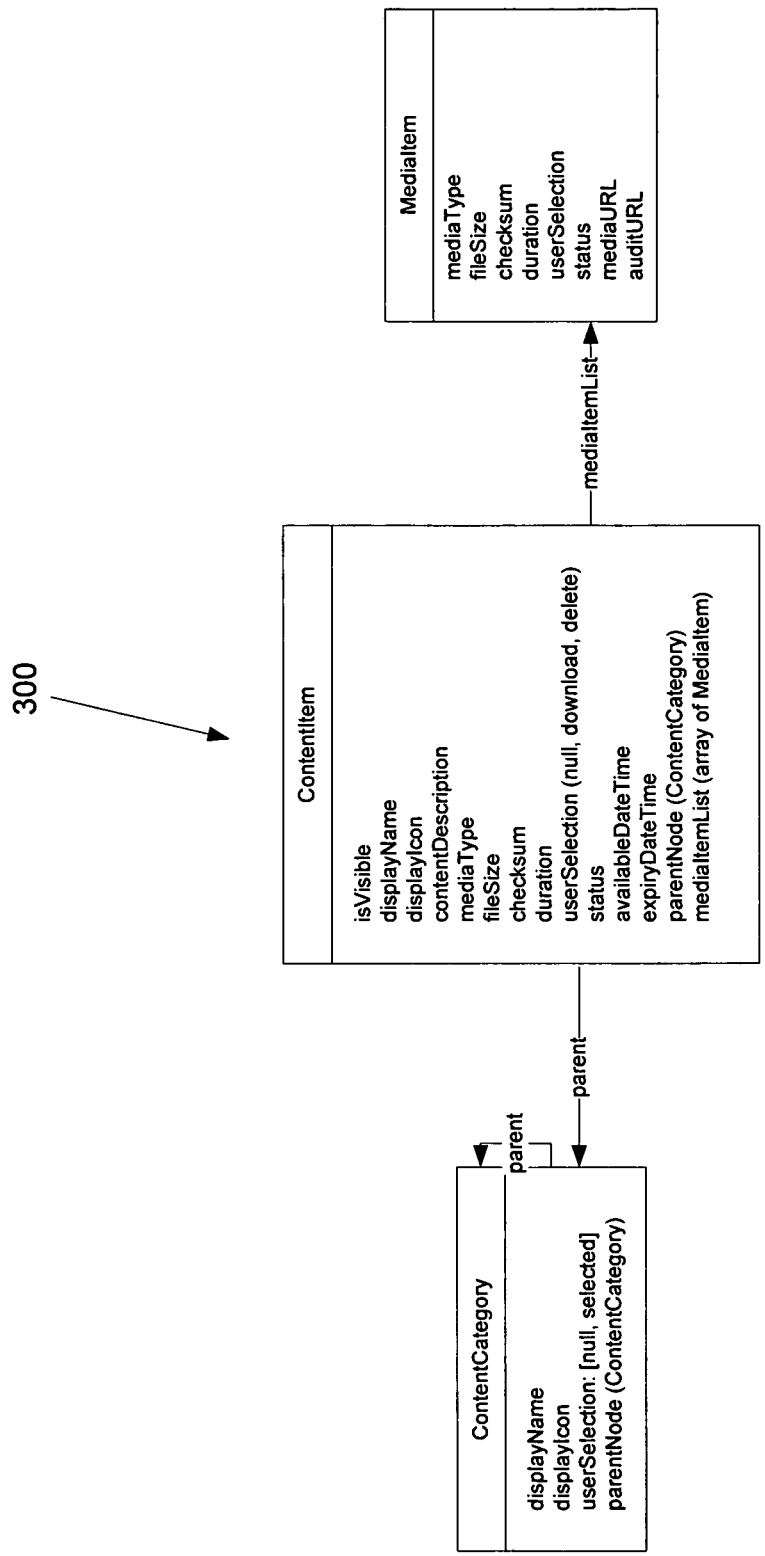
FIG. 3 illustrates a data structure.

FIG. 3 illustrates an example of the data structure 300 for a content selection and status list, such as content selection and status list 202e. As described above, the same data structure also may be used for content lists 204c. Thus, in some implementations, both the content list 204c and content selection and status list 202e use the data structure 300.

In general, data structure 300 is a hierarchy (i.e., tree) of content categories and content items, where each ContentItem structure may contain a list of one or more MediaItem structures that represent media files to be played in order for the ContentItem. Generally, the ContentItem represents the editorial content that the user can select for download. The MediaItem structures in a ContentItem are those for the editorial media files and associated advertising media files that will be presented when the user selects the editorial content for presentation. The data structure 300 may be in the eXtensible Mark-up Language (XML) format, with the fields illustrated in FIG. 3 representing XML tags. The tags illustrated in FIG. 3 may have the following meanings:

| Field Name | Description |
| --- | --- |
| ContentCategory | The category a content item is stored in |
| displayName | The display name for that category |
| displayIcon | The display icon for that category |
| userSelection: [null, selected] | The user action chosen for the category |
| parentNode (ContentCategory) | The parent node the category is a member of |
| ContentItem | The content item |
| isVisible | Should the web browser render this item? |
| displayName | The text that should be displayed if "isVisible" |
| displayIcon | The icon that should be displayed if "isVisible" |
| contentDescription | The description that should be displayed if "isVisible" |
| mediaType | The mime type of the media |
| fileSize | The size of the media |
| checksum | A hash of the file to ensure it's integrity |
| duration | The time in seconds of the media |
| userSelection (null, download, delete) | The desired action by the user or business rule |
| status | The current status of the selected action |
| availableDateTime | The date any embargo ends |
| expiryDateTime | The date the content is valid until |
| parentNode (ContentCategory) | The parent node in content hierarchy |
| mediaItemList (array of Mediaitem) | The list of media items |
| MediaItem | The Media Item |
| mediaType | The mime type of the media |
| fileSize | The size of the media |
| checksum | A hash of the file to ensure its integrity |
| duration | The time in seconds of the media |
| userSelection | The desired action by the user or business rule |
| status | The current status of the selected action |
| mediaURL | Local or remote URL where the media can be found |
| auditURL | URL to send an auditing message to |

Figure 4A:
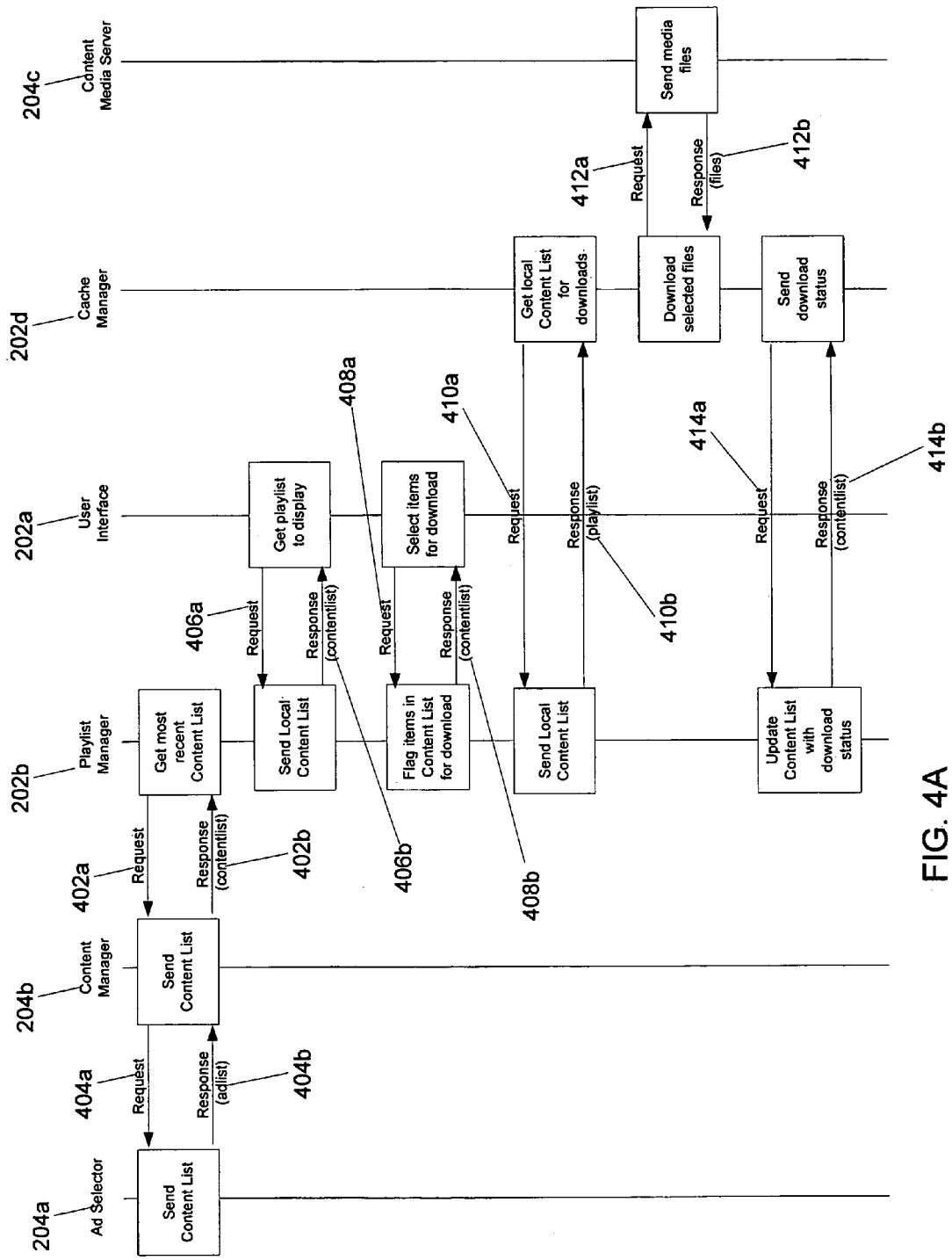
FIGS. 4A and 4B are diagrams that illustrate communications between components of the system shown in FIG. 2.
Figure 4B:
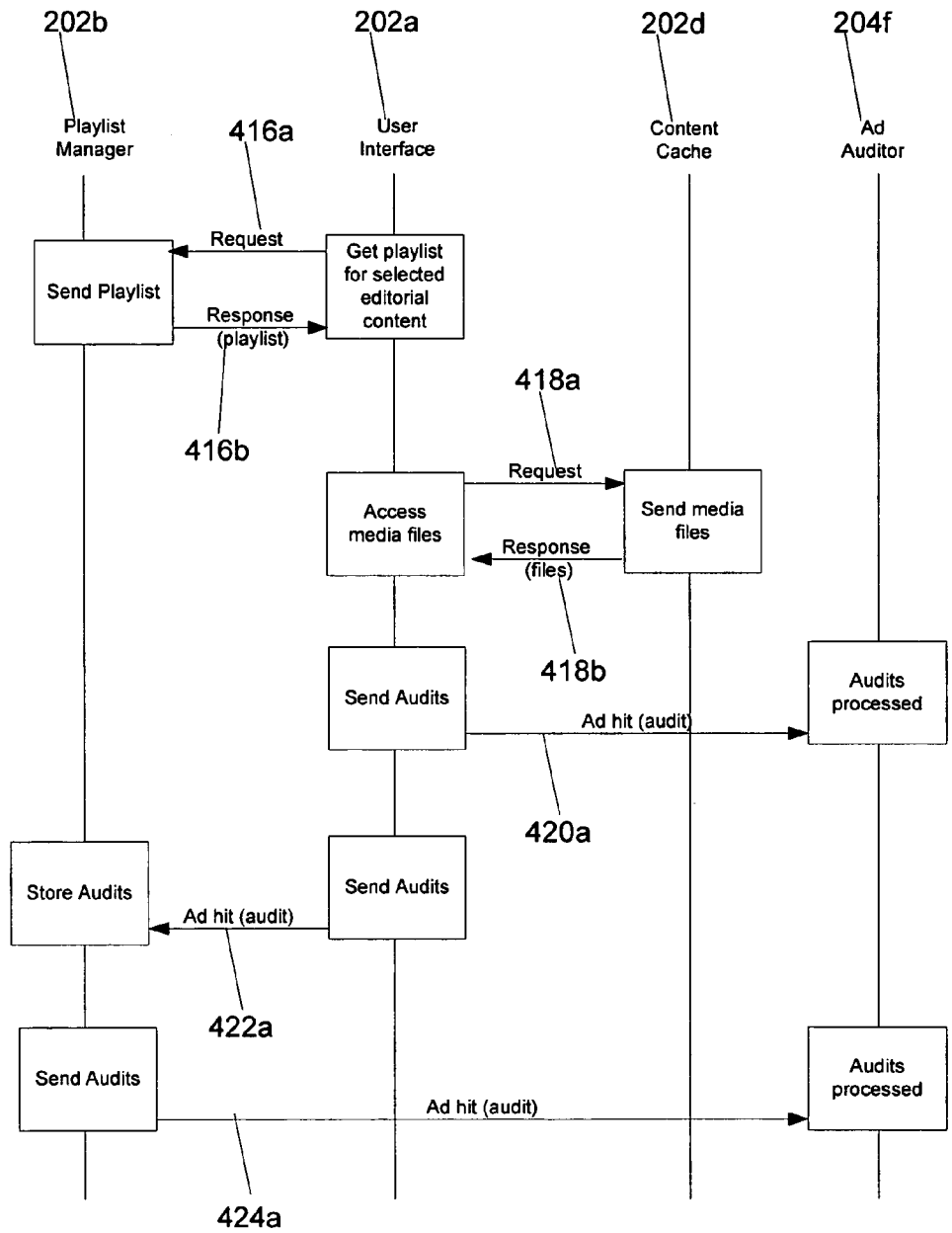

FIGS. 4A and 4B illustrate an example of the messaging 400 that may occur between various components of system 200. The components may operate asynchronously, such that there is no particular order to the messages. Messages between client-side components 202 and server-side components 204 may be remote procedure call (RPC) style messages implemented using XML in the Simple Object Access Protocol (SOAP) framework. In the example shown in FIG. 4., the content selection and status list 202e and the content list 204c have the same data structure and, consequently, the received content list 204c is used as the initial version of the content selection and status list 202e. Therefore, they both will generally be referred to below as the "content list."

Referring particularly to FIG. 4A, the playlist manager 202b sends a request for the content list to content manager 204b (402a). The request includes an identifier (e.g., GUID) associated with the end user or the client system 202. Prior to sending the content list to the playlist manager 202b, the content manager 204b inserts entries for advertising content into the content list such that the advertising content is associated with particular editorial content. For example, the content list may include a ContentItem that represents the editorial content. A MediaItem structure that represents the editorial medial files may be included in the ContentItem, and the mediaURL of that MediaItem may include the URL for downloading the editorial media file. To insert entries for advertising content associated with that editorial content, the content manager 204b may insert additional MediaItem structures that represent the advertising media files into the ContentItem structure. The mediaURL of the MediaItems includes the URL for downloading the advertising media file from the content media server 204d. The content manager 204b may insert the advertising content MediaItem structures before or after the editorial content MediaItem structure. Alternatively, or additionally, if the editorial content is composed of multiple media files, the content manager 204b may insert the advertising content MediaItem structure in-between editorial content MediaItem structures.

To obtain the information needed to insert the entries for the advertising content, the content manager 204b sends one or more requests for advertising content information to ad selector 204a (404a). The ad selector 204a selects the appropriate piece(s) of advertising content, and sends identifiers for the advertising content to the content manager 204b (404b). The content manager 204b then updates the content list to include the identifiers for the advertising content, and sends the updated content list to the playlist manager 202b (402b).

When the user invokes the user interface component 202a, the user interface component 202a requests the local copy of the content list from the playlist manager 202b (406a). Once invoked, the user interface component 202a also may periodically or aperiodically request the content list from the playlist manager (406a) and receive the local copy of the content list (406b). This allows the user interface component 202a to update the interface 202f based on updates to the playlist that, for example, result from cache manager 202d completing downloads.

The playlist manager 202b responds to the request from the user interface component 202a by sending the local copy of the content list to the user interface component 202a (406b), which uses the received content list to build the interface shown to the user. When a user makes selections in the interface 202f (e.g., selecting a piece of editorial content for download), the user interface component 202a sends a request to playlist manager 408a to update the content list (408a). The playlist manager 202b updates the content list to reflect the user selections. For example, the playlist manager 202b may flag selected editorial content and associated advertising content for download. The playlist manager 202b responds to the request by sending the updated content list to the user interface component 202a (408b), which updates the interface 202f based on the updated content list.

The cache manager 202d also periodically or aperiodically requests the content list from the playlist manager 202b (410a). The playlist manager 202b responds by sending the content list to the cache manager 202d (410b). The cache manager 202d reviews the received content list to determine which editorial content and advertising content to download. The cache manager 202d then requests the editorial content and advertising content from the content media server 204e (412a). The content media server 204e responds by sending the media files corresponding to the editorial content and the advertising content (412b). As described above, the cache manager 202d may cooperate with the content media server 204e to control the downloads so as to comply with user preferences regarding bandwidth and processing time usage.

Once selected editorial content and associated advertising content has been downloaded from the content media server 204e, the cache manager 202d sends a request to the playlist manager 202b to update the content list to reflect the completed downloads and to include an indication of their location at the client system (e.g., by modifying the mediaURL attribute to a URL for the local file) (414a). The playlist manager 202b then updates the content list to reflect the downloaded status of the editorial content and advertising content, and sends the updated content list to the cache manager 202d (414b).

Referring to FIG. 4B, when a user uses the user interface component 202a to select a piece of editorial content to be presented, the user interface component 202a sends a request to the playlist manager 202b for the playlist associated with the selected editorial content (416a). The playlist manager 202b uses the content list to develop a playlist that contains the media files for the editorial content and the associated advertising content and sends the playlist to the user interface component 202a (416b). For example, the playlist manager 202b may generate a playlist that includes the media files represented by the MediaItem structures included in the ContentItem structure that corresponds to the selected editorial content.

The user interface component 202a then uses the playlist to access and present the editorial content and the advertising content. In particular, for each media file in the playlist, the user interface component 202a sends a request to the content cache 202d for the media file (418a). The content cache 202d responds with the media file (418b), which the user interface component 202a then presents to the user. When the user interface component 202a presents the advertising media, the user interface component 202a sends an auditing message to the ad auditor 204f (420a) if a network connection to the ad auditor 204f is available. Otherwise, the user interface component 202a sends the audit message to the playlist manager 202b (422a), which stores the audit message in the content list and metrics cache 202g. When a network connection to the ad auditor 204f is available, the playlist manager 202b sends any audit messages that may have been stored in the content list and metric cache 202g to the ad auditor 204f (422a).

Referring to FIG. 5, in another implementation, the content manager functionality is implemented on the client-side, and is modified to more dynamically select which specific piece or pieces of advertising content to present when a piece of editorial content is presented. Accordingly, in the implementation of system 500 shown in FIG. 5, the client-side components 502 include a user interface component 502a that produces an interface 502f such as interface 100, an experience manager system 504 that includes the playlist manager 502b and the client-side content manager 506, a download/cache manager 502c, a content cache 502d, a content selection and status list 502e, and a content list and metrics cache 502g. The server-side components 504 include an ad selector 504a, a content provider 510, a content list 504c, a content media server 504d, available content 504e, and an ad auditor 504f.

With respect to the server-side components 504, the ad selector 504a, the content media server 504d, the set of available content 504e, and the ad auditor 504f generally operate in the same manner as the corresponding components in the implementation shown in FIG. 2, except as discussed below. In addition, the content provider 510 operates in a similar manner as the content provider described with respect to the implementation shown in FIG. 2 (but not shown in FIG. 2). Specifically, the content provider 510 makes available the content list 504c, which includes meta-data describing the content categories and the available editorial content. The content provider 510 makes the content list 504c available to the client-side content manager 506. For example, the content provider 510 may make the content list 504c available as a web service, with the client-side content manager 506 accessing the web service to obtain a copy of the content list 504c. The content list 504c may the data structure as described with respect to FIG. 3.

With respect to the client-side components 502, the content selection and status list 502e, the user interface component 502a, and the playlist manager 502b generally operate as described with respect to the implementation shown in FIG. 2. More specifically, the user interface component 502a builds and updates the interface 502f based on the content selection and status list 502e and the cache manager 502c selects, downloads, and deletes the media files for the selected editorial content based on the content selection and status list 502e. The playlist manager 502b coordinates these functions of the user interface component 502a and the cache manager 202c through updates to the content selection and status list 502e. The playlist manager 502b stores a copy of the most recent content selection and status list 502e in the content list and metrics cache 502g.

The client-side content manager 506 operates in a similar manner as the server-side content manager 204c, except that the client-side content manager 506 obtains a set of advertising content appropriate for the downloaded editorial content and/or the editorial content available for downloading, along with information regarding the business rules used by the ad selector for selecting advertising content (e.g., the campaign business rules and/or the user experience business rules), and uses the business rules to select and associate one or more particular pieces of the advertising content with a piece of editorial content when the editorial content is selected for presentation. To do so, the client-side content manager 506 contacts the ad selector 504a when a network connection to the ad selector 504a is available. When the content manager 506 contacts the ad selector 504a, the content manager 506 downloads from the ad selector 504a (1) an initial selection of a set of advertising content that is appropriate for the editorial content that is available for download or has been downloaded, (2) the campaign business rules for the selected set of advertising content, and (3) the user experience business rules applicable to the editorial content that is available for download or has been downloaded.

In addition, when the user selects a piece of editorial content for presentation, the content manager 506 selects the advertising content to be presented with the editorial content. At times, depending on the business rules, the content manager 506 may actually select zero pieces of advertising content to be associated with a piece of editorial content. For example, no advertising content may be selected in order to maintain a ratio of advertising content presented to editorial content presented.

In some implementations, when the user selects a piece of editorial content to be presented, the content manager 506 may attempt to contact the ad selector 504a to have the ad selector 504a select one or more pieces of the downloaded advertising content to be presented with the selected editorial content. If a network connection to the ad selector 504a is not available, then the content manager 506 selects the advertising content based on the downloaded campaign and user experience business rules. In other implementations, the content manager 506 may not attempt to contact the ad selector 504a when the user selects a piece of editorial content for presentation and, instead, may simply uses the downloaded campaign and user experience business rules to select advertising content. Alternatively, in other implementations, the content manager 506 may not download campaign business rules or user experience business rules and, therefore, may contact the ad selector 504a each time the user selects a piece of editorial content for presentation.

The content manager 506 also receives auditing messages generated by the user interface component 502a when the advertising content is presented and a network connection to the ad auditor 204f is not available. In general, as described above, the auditing messages indicate that a particular piece of advertising content was presented to the user, and may indicate the user's behavior while the advertising content was being presented along with other information. The content manager 506 stores the auditing messages in the content list and metrics cache 502f. Periodically or aperiodically, the content manager 506 transmits the auditing messages to the ad auditor 504f when a network connection to the ad auditor 504f is available. In some implementations, the user interface component 502a may generate and send the auditing messages to the ad auditor 504f if a network connection to the ad auditor 504f is available when the auditing message is generated, and send the auditing messages to the content manager 506 when a network connection to the ad auditor 504f is not available so that the content manager 506 can send the auditing messages to the ad auditor 504f when the network connection becomes available.

Figure 6A:
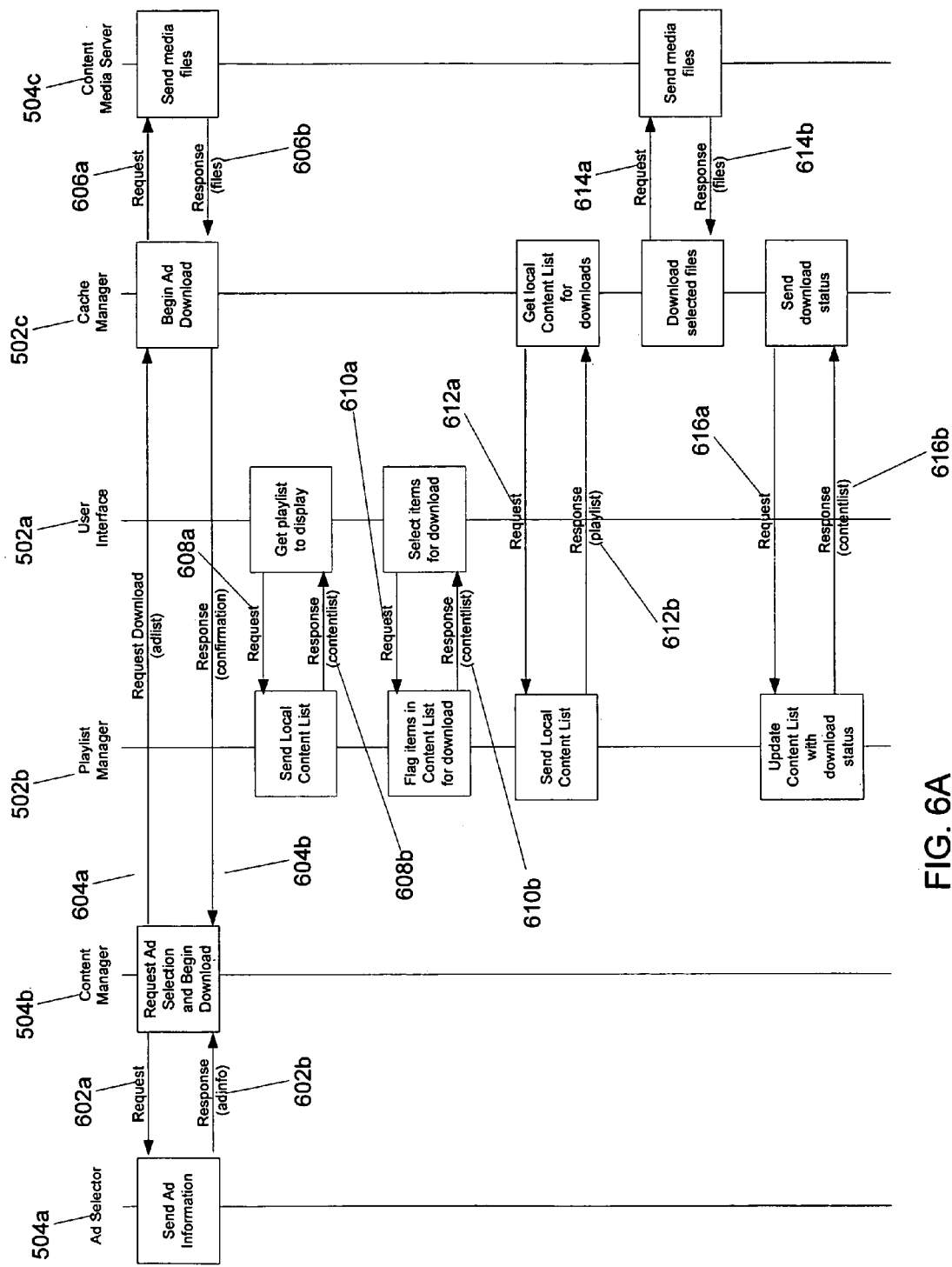
FIGS. 6A and 6B are diagrams that illustrate communications between components of the system shown in FIG. 5.
Figure 6B:
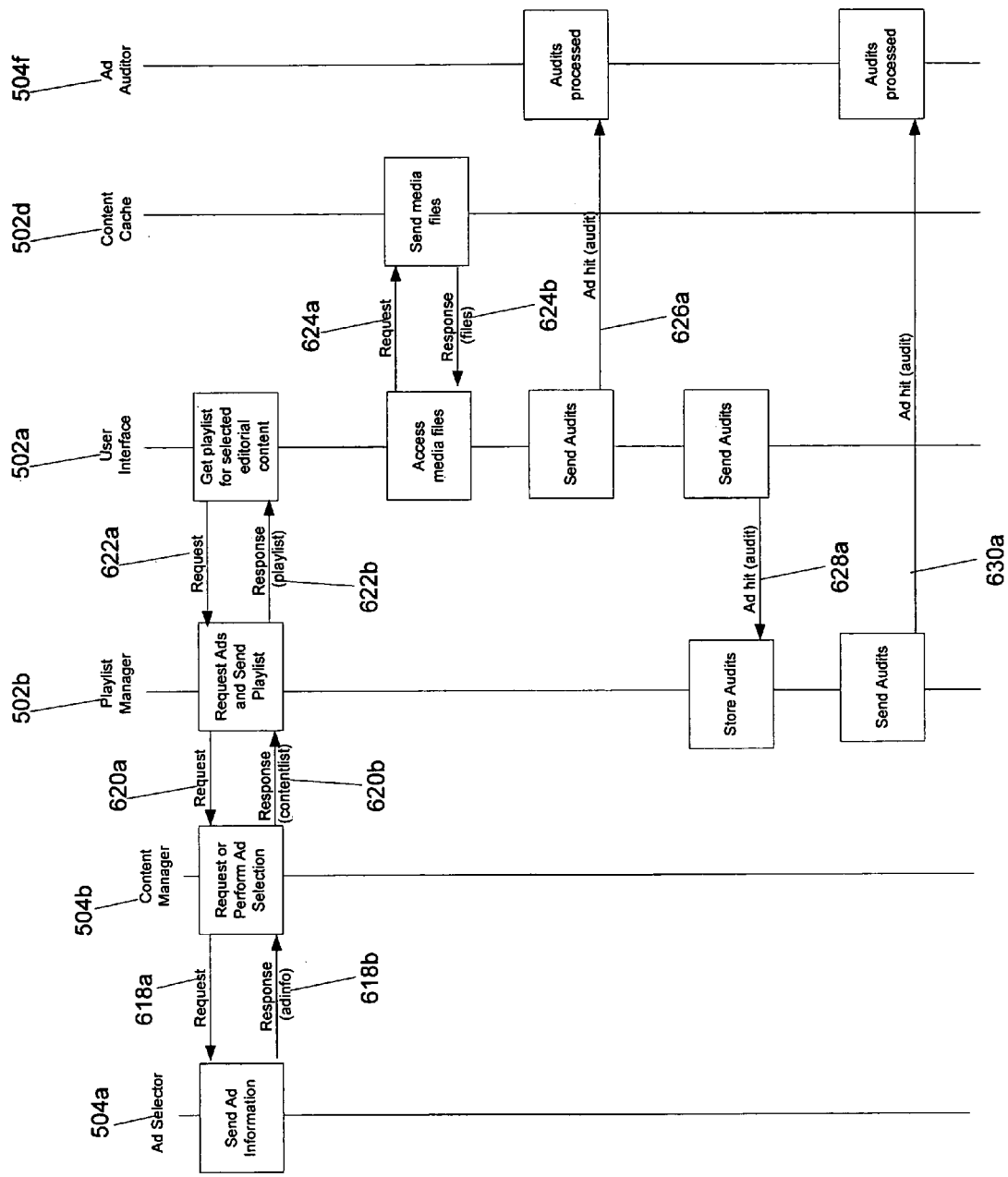

FIGS. 6A and 6B illustrate an example of the messaging 600 that may occur between various components of the implementation shown in FIG. 5. Referring to FIG. 6A, the content manager 506 obtains the content list 504c from the content provider 510 (not specifically shown). The content manager 506 then uses the content list to send a request to ad selector 504a for a selection of advertising content, and for the campaign business rules for the selected advertising content and the applicable user experience business rules (602a). The ad selector 504a then returns identifiers (e.g., URLs) of the selected advertising content and the applicable campaign and user experience business rules (602b).

For example, the content manager 506 may send to the ad selector 504a an identifier of the user (e.g., a GUID) and a list of the content categories in the content selection and status list 502e. The ad selector 504a may then select a set of advertising content that is appropriate to the user and the content categories (e.g., it may select advertising content that is appropriate for the demographic of the user and that has associated campaign business rules that target one or more of the content categories). The ad selector 504a then returns identifiers for the selected advertising content, along with the campaign business rules applicable to the selected advertising and the user experience business rules applicable to the content categories.

Once the content manager 506 receives the initial selection of advertising content, the content manager 506 instructs the cache manager 502c to download the selected advertising content (604a) and the cache manager 502c confirms that it receives those instructions (604b). The cache manager 502c then downloads the advertising content from the content media server 504d (606a and 606b).

The rest of the communications (608a-616b) and actions of playlist manager 502b, user interface component 502a, cache manager 502c are the same as the corresponding communications (406a-414b) and actions shown in FIG. 4, except that the cache manager 502c downloads the editorial content and not the advertising content in communications 612a and 612b.

Referring to FIG. 6B, when the user selects a piece of editorial content to be presented, the user interface component 202a sends a request to the playlist manager 202b for the playlist associated with the selected editorial content (622a). The playlist manager 502b accesses the content list, and sends the content list to the content manager 504b with a request to the content manager 504b to select advertising content and insert the selected advertising content into the appropriate position in the content list (620a).

To select the advertising content, the content manager 506 attempts to contact the ad selector 504a (618a) to have the ad selector 504a select one or more pieces of the downloaded advertising content to be presented with the selected editorial content, and appropriate place for the advertising content in the content list (and, hence, the playlist). If the ad selector 504a is available, the ad selector 504a returns a selection of advertising content (618b). The content manager 506 may initially attempt to contact ad selector 504a because the campaign business rules or the user experience business rules may have changed between the time they were downloaded by the content manager 506 and the time when the user selects the editorial content for presentation.

If a connection to the ad selector 504a is unavailable, the content manager 506 uses the downloaded set of campaign business rules and user experience business rules to select one or more pieces of advertising content to be presented with the editorial content, and to determine the positions of the advertising content in the content list (and, therefore, in the playlist). In either event, the content manager 506 updates the content selection and status list 502e to include the advertising content and passes the updated list 502e to the playlist manager 502b (620b), which develops a playlist that includes the editorial content and advertising content, and provides the playlist to the user interface component 502a (622b).

The rest of the communications (624a-630a) and actions of playlist manager 502b, user interface component 502a, and ad auditor 504f are the same as the corresponding communications (418a-424a) and actions shown in FIG. 4, except that the cache manager 502c downloads the editorial content and not the advertising content in communications 612a and 612b.

The above described implementations have generally indicated that the editorial content is downloaded across a network, such as the Internet. In other implementations, however, the client-side advertising application may control the insertion of advertising content into or around editorial content that is already resident at the client system (as opposed to content that is downloaded to the client system from, e.g., a content provider website). The content may be, for example, content on a DVD or recorded using a personal video recorder. For example, with respect to the implementation shown in FIG. 2, the playlist manager 202b (or cache manager system 202c) may identify the editorial content at the client system (e.g., when a DVD is inserted, or when the content is stored on a hard drive) and send an identification to the content manager 204b so that the content manager 204b can assemble a content list that includes the editorial content and, e.g., advertisements. Then, when the user indicates that he or she wants the content to be played, the items on the content list are presented (which includes the content). As another example, with respect to the implementation of FIG. 5, the experience manager system 504 may identify the editorial content at the client system and request a set of ads from the ad selector 204a. When the editorial content is then presented, the experience manager system 504 may then select which advertising content to present with the editorial content. Doing so, for example, may allow different advertisements or movie previews each time a movie on a DVD is presented.

Figure 7:
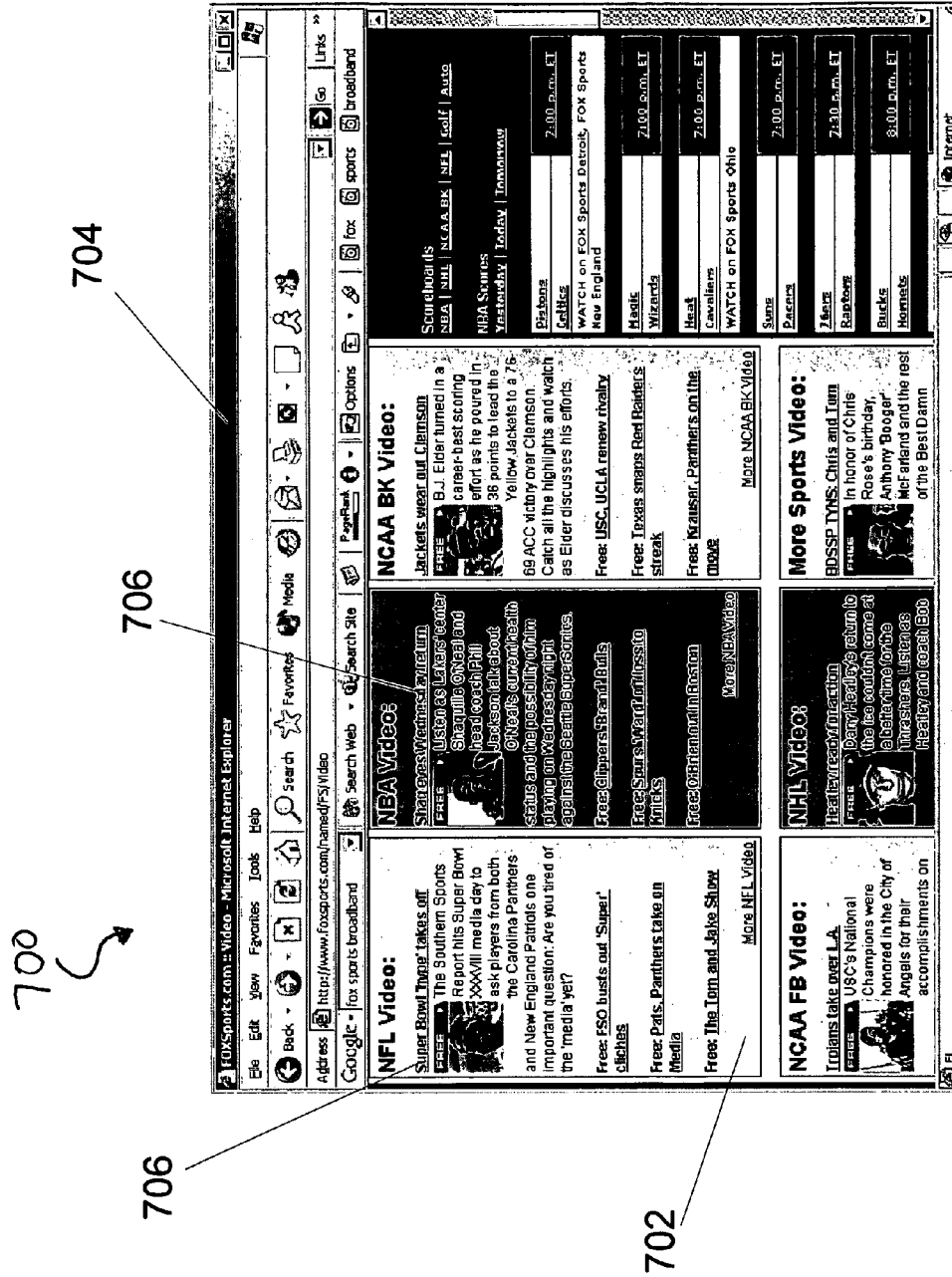
FIG. 7 illustrates an example of a user interface that may be provided on a user's client system.

Referring to FIG. 7, a user interface 700, such as a web page 702 displayed by a web browser 704, may generally provide a user with access to on-demand streaming media. As shown, the web page 702 may include one or more hyperlinks 706. Each of the hyperlinks 706 link to an on-demand video or audio stream. When the user selects one of the hyperlinks 706, a stand-alone media player, or a media player embedded in the web page 702 or another web page, connects to and presents the on-demand media stream.

Figure 8:
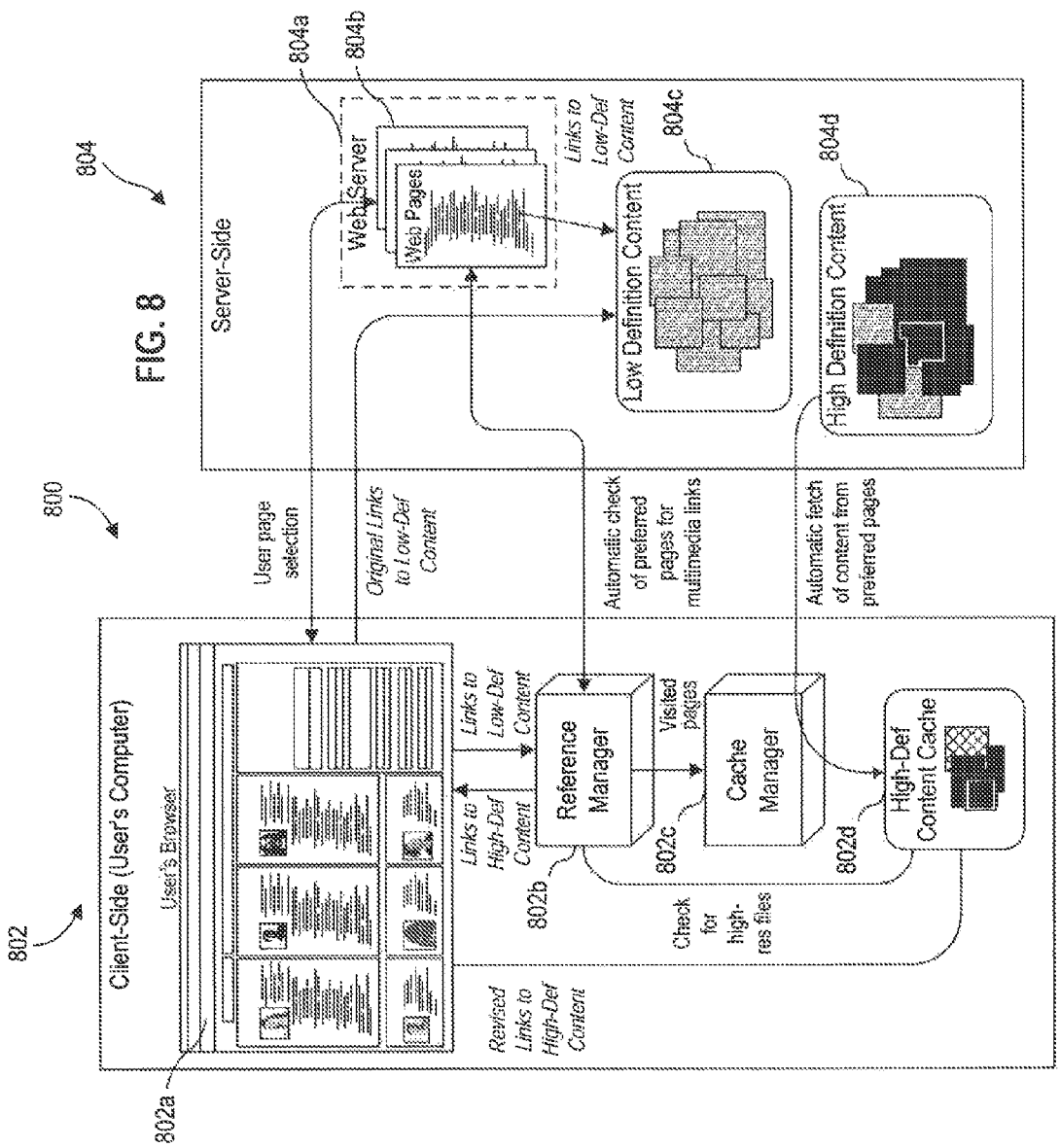
FIG. 8 illustrates an implementation of a system that dynamically links to remote or local content.

Referring to FIG. 8, a system 800 may supplement some of the remote, low-definition content linked to by hyperlinks 706 on the web page 702 with high-definition content downloaded to the user's computer. In general, in the system 800, higher definition versions of some of the content linked to by hyperlinks 706 are downloaded to the user's computer, and are presented instead of the low-definition versions. Which pieces of content are downloaded may be inferred based on explicit user preferences and previous user behavior.

The system 800 includes client-side components 802 and server-side components 804. The server-side components 804 include a web server 804a, one or more web pages 804b, low-definition content 804c, and high-definition content 804d. The web pages 804b include hyperlinks to the low-definition content 804c. The high-definition content 804d includes versions of the low-definition content 804c that are higher definition than what can be supported by the network bandwidth, or at least higher definition than the low-definition versions 804c. That is, the higher definition content 804d includes versions that have better video quality than the low definition content 804c. The video quality may be measured using an objective measure, such as the peak signal-to-noise ratio (PSNR), or a subjective measure, such as one of those described in ITU-T recommendation BT.500.

The client-side components include a web browser 802a, a reference manager 802b, a cache manager 802c, and a high-definition content cache 802d. The user interface 802a is a standard browser that requests and renders web pages 804b. Web pages 804b include code that invoke local functions that enable the browser to pass an identifier of the web page to reference manager 802b, and, when a user selects a hyperlink 706, forwards the user request for content to the reference manager 802b. Communication between the browser and the reference manager 802b may be implemented using a local web service, a browser plug-in, or an ActiveX control. If the reference manager 802b is not installed or some other component of the system is not available, the code causes the hyperlinks in web pages 804b to simply point to the low-definition content 804c, with the web page and browser 802a operating as normal to access the low-definition content 804c.

The reference manager 802b controls whether a remote, low-definition file or a local, high-definition file is accessed when the user selects a piece of content. As described above, when the user selects a hyperlink 706, the user's request for content is sent to reference manager 802b. In response, the reference manager 802b provides a remote URL or a local URL to the browser 802a in response to the user request for content. The reference manager 802b provides a remote URL when a high-definition version is not stored locally in the high-definition content cache 802d. The remote URL points to the remote low-definition version 804c of the selected content. The reference manager 802b provides a local URL when a high-definition version of the content has been downloaded and is stored in the high-definition content cache 802d. The local URL points to a high-definition version of the content in high-definition cache 802d. Thus, when a high-definition version of the content exists locally, the user is presented with the high-definition version instead of the low-definition version.

The reference manager 802b also controls which high-definition content is downloaded to high-definition cache 802d. Reference manager 802b may infer which content linked to by hyperlinks 706 is of most interest to the user, and cause the high-definition versions of that content to be pre-fetched prior to the user selecting the content for presentation. Reference manager 802b may infer which content is of most interest to the user based on explicit user preferences and/or user behavior. For instance, if the user designates that "sports" is a category of high interest to the user, then high-definition versions of the content linked to by a sports web page may be pre-fetched. Alternatively, or additionally, the reference manager 802b may track which web pages the user requests, and cause the cache manager 802e to pre-fetch high-definition versions of the content on the web pages most frequently visited by the user.

The reference manager 802b may periodically access the web pages for which high-definition content is pre-fetched to determine which content is linked to by those pages, and to cause the high-definition versions be downloaded. For example, the reference manager 802b may periodically or aperiodically access the "sports" web page and determine which content is linked to by the sports web page. The reference manager 802b then causes high definition versions 804d of the content to be downloaded so that it is available when the user accesses the sports web page and selects a piece of content linked to by the sports web page.

The cache manager 802c controls the downloading of the content selected by the reference manager 802b for pre-fetching. The cache manager 802c controls the downloads based on user preferences such as network or processor idle time, and bandwidth limits. Also, the cache manager 802c controls the deletion of high-definition content in high-definition content cache 802d.

Figure 9:
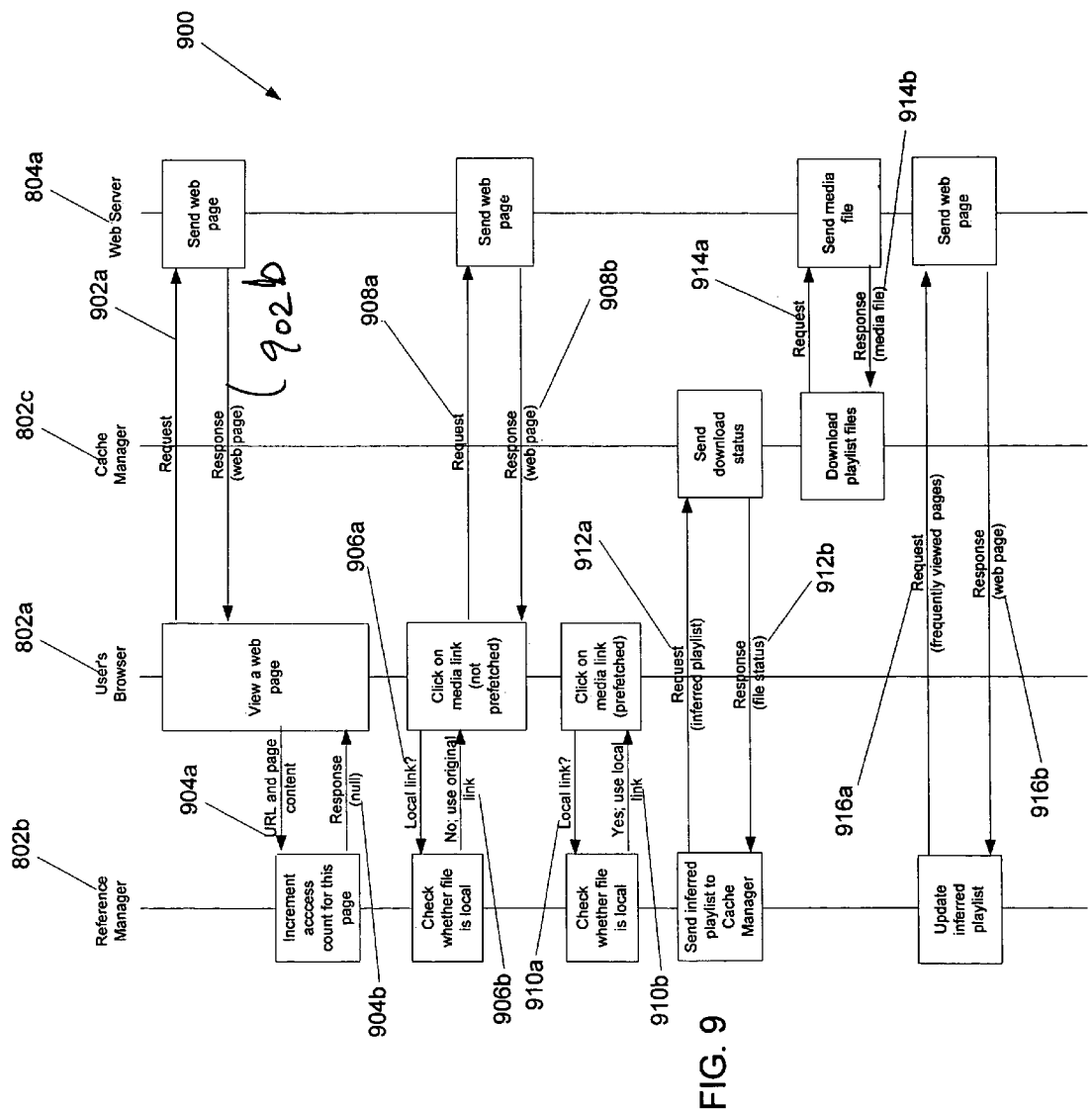
FIG. 9 is a diagram that illustrates communications between components of the system shown in FIG. 8.

FIG. 9 illustrates an example of the messaging 900 that may occur between various components of system 800 for an implementation in which the reference manager pre-fetches editorial content for the web pages the user visits most frequently. The components may operate asynchronously, such that there is no particular order to the messages.

The browser 802a sends a request for a web page to the web server 804a (902a), which responds with the web page (902b). The web page includes a mechanism (e.g., Javascript, plug-in, ActiveX) that passes the URL and a copy of the page to the reference manager 802b (904a), which acknowledges receipt of the URL and web page content (904b). The reference manager 802b keeps track of how often the user visits this particular web page.

When the user selects a hyperlink in the web page that corresponds to a piece of content, a request is sent to the reference manager 802b to determine whether a local, high-definition version of the content exists (906a and 910a). When a local high, definition version does not exist, the reference manager 802b responds with the URL to the remote low-definition version of the content (906b), which causes the browser 802a to request (908a) and receive (908b) a web page that presents the low-definition version of the content. On the other hand, when the local high-definition file exists, the reference manager 802b responds with the URL that points to the local, high-definition version of the content (910b), which the browser 802a then accesses and presents to the user.

The reference manager 802b builds an inferred content download list from the web pages visited most often by the user. The reference manager 802b sends this list to the cache manager 802c (912a), which returns the status of all files being downloaded or finished downloading and available (912b). The cache manager 802c also requests (914a) and receives (914b) the media files corresponding to the list items from the web server 804a.

The reference manager 802b also periodically or aperiodically updates the list by fetching web pages that the user visits often. To that end, the reference manager 802b requests the frequently visited web pages from web server 804a (916a), which returns the requested web pages to the reference manager 802b (916b). The reference manager 802b then uses the new versions of the web pages to update the list.

While the implementation described with respect to FIGS. 7 and 8 describe changing links to low definition content to links to high definition content, other implementations more generally may change links from less desirable content to more desirable content. The desirability of content may be based on a number of mean metrics such as the content being available as a locally cached file (whether in high-definition of not), being a higher quality file (whether local or remote), being available from a network connection that has better bandwidth than others, or being available from a network connection that has a better quality of service than others.

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on one or more computer-usable storage media or devices (for example, CD-ROM, RAM, or magnetic disk). When read into the processor of the computer and executed, the instructions of the program cause the programmable computer to carry out the various operations described above.

A number of implementations have been described. Nevertheless, it will be understood that various modifications may be made. For example, elements of one or more implementations may be combined, deleted, supplemented, or modified to form further implementations. In addition, while the foregoing techniques have been described with respect to downloaded content, the techniques can be adapted for streaming content. Accordingly, other implementations are within the scope of the following claims.

What is claimed is:

1. A system comprising:
   at least one processing device located at a client device; and
   at least one storage device located at the client device and storing instructions that, when executed by the at least one processing device, cause the processing device to implement:
      an interface component configured to present an interface that allows a user to select a piece of editorial content for download;
      an experience manager configured to request selection of a set of advertising content pieces for the piece of selected editorial content from an ad selector, receive an indication of a selected set of advertising content pieces from the ad selector, and associate the selected set of advertising content pieces with the piece of selected editorial content; and
      a download manager configured to request and receive from a first server the selected piece of editorial content when the user selects the piece of editorial content for download and, based on the association of the selected set of advertising content pieces with the selected piece of editorial content, to request and receive from a second server the set of advertising content pieces,
         wherein the experience manager is further configured to: obtain a set of rules from a back-end advertising system, wherein the set of rules include campaign business rules for the set of advertising content pieces;
         select, when a network connection from the client device to the ad selector is unavailable, at least one piece of advertising content from the set of downloaded advertising content pieces based on the campaign business rules when the user selects the downloaded piece of editorial content for presentation; and
         provide a playlist to the user interface component when the user selects the downloaded piece of editorial content for presentation, the playlist including the downloaded piece of editorial content and the selected at least one piece of advertising content, wherein the user interface component is configured to use the playlist to sequentially present the downloaded piece of editorial content and the selected at least one piece of advertising content.

2. The system of claim 1 wherein the set of rules further include user experience business rules and the experience manager is configured to select the at least one piece of advertising content based on both the campaign business rules and the user experience business rules.

3. The system of claim 2 wherein the experience manager is further configured to select the at least one piece of advertising content from the set of advertising content pieces based on the obtained campaign business rules and the obtained user experience business rules when a network connection from the client device to an ad selector is unavailable.

4. The system of claim 2 wherein, to obtain the campaign business rules and the user experience business rules, the experience manager is configured to communicate with an ad selector to receive the campaign business rules and the user experience business rules.

5. The system of claim 2 wherein the campaign business rules indicate one or more of the following: one or more content categories of editorial content, timing of when the advertising content pieces should be presented, percentage of users to whom the advertising content pieces should be presented, frequency with which the advertising content pieces should be presented, number of times the advertising content pieces should be presented in a period of time, or geographic locations.

6. The system of claim 2 wherein the user experience business rules indicate one or more of the following: one or more ratios of advertising content pieces presented to editorial content presented, one or more types of advertising content pieces that should be presented, and one or more orders in which advertising content pieces and editorial content should be presented.

7. The system of claim 1 wherein, to select the at least one piece of advertising content from the set of downloaded advertising content pieces, the experience manager is configured to communicate with an ad selector to obtain an indication of the at least one piece of advertising content.

8. The system of claim 1 wherein, to associate the selected set of advertising content pieces with the piece of editorial content, the experience manager is configured to insert an identifier of the set of advertising content pieces into a content list that includes an identifier for the piece of editorial content.

9. The system of claim 1 wherein the user interface component is configured to send an auditing message to the experience manager when the user interface component presents the at least one piece of advertising content while a network connection to an ad auditor is unavailable.

10. The system of claim 9 wherein the experience manager is configured to send the auditing message to the ad auditor when a network connection to the ad auditor is available.

11. A method comprising:
executing instructions on one or more processing devices such that the one or more processing devices perform the following:
presenting an interface that allows a user to select a piece of editorial content for download;
requesting selection of a set of advertising content pieces for the selected piece of editorial content from an ad selector;
receiving an indication of a selected set of advertising content pieces from the ad selector;
associating the selected set of advertising content pieces with the selected piece of editorial content;
requesting and receiving from a first server the selected piece of editorial content when the user selects the piece of editorial content for download;
requesting and receiving, based on the association of the selected set of advertising content pieces with the selected piece of editorial content, the associated set of advertising content pieces;
obtaining a set of rules from a back-end advertising system, wherein the set of rules include campaign business rules for the set of advertising content pieces;
selecting, when a network connection to the ad selector is unavailable, at least one piece of advertising content from the set of downloaded advertising content pieces based on the campaign business rules when the user selects the downloaded piece of editorial content for presentation;
providing a playlist to the interface when the user selects the downloaded piece of editorial content for presentation, the playlist including the downloaded piece of editorial content and the selected at least one piece of advertising content; and
sequentially presenting the downloaded piece of editorial content and the selected at least one piece of advertising content using the playlist.

12. The method of claim 11 wherein the set of rules further include user experience business rules, and selecting the at least one piece of advertising content comprises selecting the at least one piece of advertising content based on both the campaign business rules and the user experience business rules.

13. The method of claim 12 wherein selecting the at least one piece of advertising content further comprises selecting the at least one piece of advertising content from the set of advertising content pieces based on the obtained campaign business rules and the obtained user experience business rules when a network connection to an ad selector is unavailable.

14. The method of claim 12 wherein obtaining the campaign business rules and the user experience business rules comprises communicating with an ad selector to receive the campaign business rules and the user experience business rules.

15. The method of claim 11 wherein selecting the at least one piece of advertising content comprises communicating with an ad selector to obtain an indication of the at least one piece of advertising content.

16. The method of claim 11 wherein associating the selected set of advertising content pieces with the piece of editorial content comprises inserting an identifier of the set of advertising content pieces into a content list that includes an identifier for the piece of editorial content.

17. The method of claim 11 further comprising storing an auditing message when the at least one piece of advertising content is presented while a network connection to an ad auditor is unavailable.

18. The method of claim 17 further comprising sending the auditing message to the ad auditor when a network connection to the ad auditor is available.

19. The method of claim 11 wherein selecting the at least one piece of advertising content from the set of downloaded advertising content pieces comprises selecting the at least one piece of advertising content from the set of downloaded advertising content pieces based on the obtained campaign business rules when a network connection from the client device to an ad selector is unavailable.

20. A system comprising:
at least one processing device located at a client device; and
at least one storage device located at the client device and storing instructions that, when executed by the at least one processing device, cause the processing device to implement:
an interface component configured to present an interface that allows a user to select a piece of editorial content for download;
an experience manager configured to request selection of a set of advertising content pieces for the selected piece of editorial content from an ad selector, receive an indication of a selected set of advertising content pieces from the ad selector, and associate the selected set of advertising content pieces with the selected piece of editorial content; and
a download manager configured to request and receive from a first server the selected piece of editorial content when the user selects the piece of editorial content for download and, based on the association of the selected set of advertising content pieces with the selected piece of editorial content, to request and receive from a second server the set of advertising content pieces,
wherein the experience manager is further configured to:
obtain a set of campaign business rules for the set of advertising content pieces and a set of user experience business rules from a back-end advertising system;
select, when a network connection from the client device to an ad selector is unavailable, at least one piece of advertising content from the set of downloaded advertising content pieces based on the set of campaign business rules and the set of user experience business rules when the user selects the downloaded piece of editorial content for presentation; and provide a playlist to the user interface component when the user selects the downloaded piece of editorial content for presentation, the playlist including the downloaded piece of editorial content and the selected at least one piece of advertising content, wherein the user interface component is configured to use the playlist to sequentially present the downloaded piece of editorial content and the selected at least one piece of advertising content, wherein the campaign business rules indicate one or more of the following: one or more content categories of editorial content, timing of when the advertising content pieces should be presented, percentage of users to whom the advertising content pieces should be presented, frequency with which the advertising content pieces should be presented, number of times the advertising content pieces should be presented in a period of time, or geographic locations, and wherein the user experience business rules indicate one or more of the following: one or more ratios of advertising content pieces presented to editorial content presented, one or more types of advertising content pieces that should be presented, and one or more orders in which advertising content pieces and editorial content should be presented.

21. A system comprising:
at least one server configured to send a piece of editorial content, a set of advertising content pieces, and a set of campaign business rules for the set of advertising content pieces to a client device, such that the client device implements:
an interface component configured to present an interface that allows a user to select the piece of editorial content for download;
an experience manager configured to request selection of the set of advertising content pieces for the selected piece of editorial content from the server, receive an indication of a selected set of advertising content pieces from the server, and associate the selected set of advertising content pieces with the selected piece of editorial content; and
a download manager configured to request and receive from the server the selected piece of editorial content when the user selects the piece of editorial content for download and, based on the association of the selected set of advertising content pieces with the selected piece of editorial content, to request and receive from a second server the set of advertising content pieces, wherein the experience manager is further configured to:
obtain the set of campaign business rules for the set of advertising content;
select, when a network connection from the client device to the server is unavailable, at least one piece of advertising content from the set of downloaded advertising content pieces based on the campaign business rules and the user experience business rules when the user selects the downloaded piece of editorial content for presentation; and
provide a playlist to the user interface component when the user selects the downloaded piece of editorial content for presentation, the playlist including the downloaded piece of editorial content and the selected at least one piece of advertising content, wherein the user interface component is configured to use the playlist to sequentially present the downloaded piece of editorial content and the selected at least one piece of advertising content.

22. The system of claim 21 wherein the server is further configured to send a set user experience business rules and the experience manager is configured to select the at least one piece of advertising content based on both the campaign business rules and the user experience business rules.

23. The system of claim 22 wherein the experience manager is further configured to select the at least one piece of advertising content from the set of downloaded advertising content pieces based on the obtained campaign business rules and the obtained user experience business rules when a network connection from the client device to an ad selector is unavailable.

24. The system of claim 22 wherein, to obtain the campaign business rules and the user experience business rules, the experience manager is configured to communicate with an ad selector to receive the campaign business rules and the user experience business rules.

25. The system of claim 22 wherein the campaign business rules indicate one or more of the following, including: one or more content categories of editorial content, timing of when the advertising content pieces should be presented, percentage of users to whom the advertising content pieces should be presented, frequency with which the advertising content pieces should be presented, number of times the advertising content pieces should be presented in a period of time, or geographic locations.

26. The system of claim 22 wherein the user experience business rules indicate one or more of the following, including: one or more ratios of advertising content pieces presented to editorial content presented, one or more types of advertising content pieces that should be presented, and one or more orders in which advertising content pieces and editorial content should be presented.

27. The system of claim 21 wherein, to select the at least one piece of advertising content from the set of downloaded advertising content pieces, the experience manager is configured to communicate with an ad selector, when a network connection is available, to obtain an indication of the at least one piece of advertising content.

28. The system of claim 27 wherein the experience manager is configured to send the auditing message to the ad auditor when a network connection to the ad auditor is available.

29. The system of claim 21 wherein, to associate the selected set of advertising content pieces with the piece of editorial content, the experience manager is configured to insert an identifier of the set of advertising content pieces into a content list that includes an identifier for the piece of editorial content.

30. The system of claim 21 wherein the user interface component is configured to send an auditing message to the experience manager when the user interface component presents the at least one piece of advertising content while a network connection to an ad auditor is unavailable.

31. A method comprising:
configuring a server to send a piece of editorial content, a set of advertising content pieces, and a set of campaign business rules for the set of advertising content pieces to a client device, such that the client device implements:
an interface component configured to present an interface that allows a user to select the piece of editorial content for download;

an experience manager configured to request selection of the set of advertising content pieces for the selected piece of editorial content from the server, receive an indication of a selected set of advertising content pieces from the server, and associate the selected set of advertising content pieces with the selected piece of editorial content; and a download manager configured to request and receive from the server the selected piece of editorial content when the user selects the piece of editorial content for download and, based on the association of the selected set of advertising content pieces with the selected piece of editorial content, to request and receive from a second server the set of advertising content pieces, wherein the experience manager is further configured to:
  obtain the set of campaign business rules for the set of advertising content;
  select, when a network connection from the client device to the server is unavailable, at least one piece of advertising content from the set of downloaded advertising content pieces based on the campaign business rules and the user experience business rules when the user selects the downloaded piece of editorial content for presentation; and
  provide a playlist to the user interface component when the user selects the downloaded piece of editorial content for presentation, the playlist including the downloaded piece of editorial content and the selected at least one piece of advertising content, wherein the user interface component is configured to use the playlist to sequentially present the downloaded piece of editorial content and the selected at least one piece of advertising content.

* * * * *